(12) United States Patent
Nemetz et al.

(10) Patent No.: US 8,655,748 B2
(45) Date of Patent: *Feb. 18, 2014

(54) METHOD FOR SELLING CONTENT OVER A NETWORK

(75) Inventors: Thomas Nemetz, Salzburg (AT); Andreas Riegler, Tenneck (AT); Andreas Spechtler, Grödig (AT)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/371,268

(22) Filed: Feb. 10, 2012

(65) Prior Publication Data
US 2012/0143724 A1    Jun. 7, 2012

Related U.S. Application Data

(63) Continuation of application No. 12/794,624, filed on Jun. 4, 2010, now Pat. No. 8,121,906, which is a continuation of application No. 11/762,361, filed on Jun. 13, 2007, now Pat. No. 7,734,511, which is a continuation of application No. 10/832,186, filed on Apr. 26, 2004, now abandoned.

(51) Int. Cl.
*G06Q 30/00* (2012.01)

(52) U.S. Cl.
USPC .............................. 705/26.8; 705/53; 705/59

(58) Field of Classification Search
USPC ..................... 705/26.1, 26.8, 27.1, 53, 54, 59
See application file for complete search history.

(56) References Cited

U.S. PATENT DOCUMENTS

| | | | |
|---|---|---|---|
| 5,459,506 A * | 10/1995 | Bushnell | 725/104 |
| 5,616,876 A | 4/1997 | Cluts | |
| 6,882,979 B1 | 4/2005 | Reay et al. | |
| 6,968,175 B2 | 11/2005 | Raivisto et al. | |
| 6,987,987 B1 | 1/2006 | Vacanti et al. | |
| 7,096,203 B2 | 8/2006 | Pence et al. | |
| 7,369,841 B1 * | 5/2008 | Uhlik et al. | 455/406 |
| 7,734,511 B2 | 6/2010 | Nemetz et al. | |
| 7,801,171 B2 | 9/2010 | Skoczkowski et al. | |
| 7,904,948 B2 | 3/2011 | Bazot et al. | |
| 8,121,906 B2 | 2/2012 | Nemetz et al. | |
| 2002/0120564 A1 | 8/2002 | Strietzel | |
| 2003/0033157 A1 * | 2/2003 | Dempski et al. | 705/1 |
| 2003/0187799 A1 | 10/2003 | Sellars et al. | |
| 2003/0212739 A1 * | 11/2003 | Boucher et al. | 709/203 |
| 2004/0033797 A1 | 2/2004 | Raivsto et al. | |
| 2004/0205333 A1 * | 10/2004 | Bjorkengren | 713/153 |

(Continued)

OTHER PUBLICATIONS

Office Action mailed Oct. 12, 2011, in U.S. Appl. No. 12/794,624, filed Jun. 4, 2010.

(Continued)

*Primary Examiner* — Nicholas D Rosen
(74) *Attorney, Agent, or Firm* — Stoel Rives LLP

(57) ABSTRACT

A method to generate revenue from supplied content is provided. Content is provided to a consumer via a network by providing a content service that allows the consumer to select and retrieve content as a package together with a clearing of the selectable content to an operator used by the consumer to select and retrieve the content via the network. Any content selected by the consumer is supplied directly to the consumer via the operator. The operator is charged for the supplied content.

14 Claims, 5 Drawing Sheets

(56) References Cited

U.S. PATENT DOCUMENTS

| | | |
|---|---|---|
| 2005/0021420 A1 | 1/2005 | Michelitsch et al. |
| 2005/0154764 A1 | 7/2005 | Riegler et al. |
| 2005/0216940 A1 | 9/2005 | Black |
| 2005/0240487 A1 | 10/2005 | Nemetz et al. |
| 2006/0020614 A1 | 1/2006 | Kolawa et al. |
| 2007/0234391 A1 | 10/2007 | Hunter et al. |

OTHER PUBLICATIONS

Author Unknown, Article Entitled "PICK Communications Corp. Launches www.pickradio.com Using Microsoft Windows Media Player Technologies"; Business Wire, p. 1190; Apr. 7, 1999 (2 pgs.).

Cole, Richard; Article Entitled "Gaming Service Scores (Interactive TV)"; Cable World, vol. 13, No. 1, p. 17, Jan. 1, 2001 (1 pg.).

Office Action mailed Sep. 18, 2009, in U.S. Appl. No. 11/762,361, filed Jun. 13, 2007.

Office Action mailed Dec. 13, 2006, in U.S. Appl. No. 10/832,186, filed Apr. 26, 2004.

Author Unknown, Article Entitled "Broadcasters shake up Dutch cable fees"; Gale Group Globalbase, Screen Digest; May 1998 (1 pg.).

Author Unknown, Article Entitled "Royalty Rates for Internet Radio Rejected"; Washington Post, May 22, 2002 (1 pg).

\* cited by examiner

METHOD FOR SELLING CONTENT OVER A NETWORK

CROSS-REFERENCE TO RELATED APPLICATIONS

This application is a continuation of U.S. patent application Ser. No. 12/794,624, filed Jun. 4, 2010, now U.S. Pat. No. 8,121,906, which is a continuation of U.S. patent application Ser. No. 11/762,361, filed Jun. 13, 2007, now U.S. Patent No. 7,734,511, which is a continuation of U.S. patent application Ser. No. 10/832,186, filed Apr. 26, 2004, now abandoned, all of which are fully incorporated herein by reference.

FIELD OF THE INVENTION

The present invention relates to a method for selling content items, such as entertainment or information, in audio, text, and/or audiovisual format. The content items, generally referred to as "content," are provided by one or more content providers to at least one consumer via a network.

Documents cited in this text are incorporated herein by reference. Documents incorporated by reference into this text are not admitted to be prior art. Furthermore, authors or inventors on documents incorporated by reference into this text are not to be considered to be "another" or "others" as to the present inventive entity and vice versa, especially where one or more authors or inventors on documents incorporated by reference into this text are an inventor or inventors named in the present inventive entity.

BACKGROUND OF THE INVENTION

Networks are ubiquitous in modern society. For example, telephone networks, computer networks and cellular networks are integral aspects of day-to-day living. Although these networks were once separate entities, they now interact with each other to allow for the transport of data to any connected device.

These networks also provide people with access to data: data that informs and entertains. Typically, once information and entertainment items that suit the needs, wants and tastes of a consumer are determined, access of the content of these items is performed. The consumer, however, usually has to pay the content provider for the supplied content.

A Personal Media System (PMA) has been developed. The PMA is an entertainment product offering music service, e.g., personalized channel, pre-defined channel, pre-defined playlist, consumer-defined playlist, music selection feature, and related content like ringtones, news service, and/or community service in audio, audiovisual and text form. The PMA service is offered to end-consumers over any data network, e.g., mobile telephone network, broadband internet, and/or digital interactive TV.

The PMA service is available on any capable device, e.g., mobile phone, personal computer, home entertainment product, e.g., TV set, HiFi stereo, game console, and/or mobile entertainment product, e.g. Network Walkman by Sony Corporation. The service offered includes, for example, a streaming service, wherein the consumer does not own the content, and a download service, wherein the consumer does own or license the content.

Therefore, a sophisticated structure to supply content to consumers is provided by the PMA. However, since charging for such services is typically made via credit card, or specially arranged accounts that need to be filled by the consumers, no easy and convenient method is available for the service provider (which generally might also be the content provider) to charge for the supplied content. A need exists, therefore, for such a charging method.

OBJECTS AND SUMMARY OF THE INVENTION

It is the object of the present invention, therefore, to provide an alternative method to sell content, which is provided by one or more content providers, to at least one consumer via a network.

In accordance with one embodiment of the present invention, a method for generating revenue from supplied content is provided, wherein said content provided by at least one content provider to a consumer via a network, having the steps of providing a content service that allows the consumer to select and retrieve content together with a clearing of the selectable content to an operator used by the consumer to select and retrieve the content via the network, directly supplying content selected by the consumer to the consumer via the operator, and charging the operator for the supplied content. The content service is preferably provided as an automated service that includes a content database of content available on a content server and the possibility to access this content database for the purpose of selection of content from the content database. The content service might support the automated selection of content based on user profiles. The content service and the content database are preferably provided on a server, such as an internet server and/or a broadcast server and/or an internal or external server that can directly be dialed up. The direct supply of the content from the content server to the consumer is preferably performed via the same connection via which the content is selected, but also another connection might be used as long as the same operator is used (that also includes a sub-operator used by the operator to provide e.g. another type of connection, e.g. a broadband connection might be used for receiving the content while a telephone connection is used to select the content). Also, the content database and the content server might be provided by different units, e.g. one offering the selection service and the other supplying the selected content. The charging of the operator is preferably performed in an on-line manner, but can also be performed conventionally, e.g. as a collected bill for a certain time period.

In accordance with another embodiment of the present invention, the method for selling content further includes the step of licensing content from the at least one content provider to provide selectable content that can be offered within said content service.

In accordance with a further embodiment of the present invention, the method for selling content also includes the steps of generating a content playlist for the consumer, and/or providing individual content selections by the consumer for allowing the consumer to select content within said content service.

In accordance with a still further embodiment of the present invention, the method of selling content further includes the step of providing a content access client that allows for the usage of the content service by the consumer.

BRIEF DESCRIPTION OF THE DRAWINGS

In this specification and the accompanying drawings, some preferred embodiments of the invention are shown and described, and various alternatives and modifications thereof are suggested. It is to be understood that these are not intended to be exhaustive and that many other changes and modifications can be made within the scope of the invention.

The suggestions herein are selected and included for purposes of illustration in order that others skilled in the art will more fully understand the invention and the principles thereof and will thus be able to modify it in a variety of forms, each as may be best suited to the conditions of a particular use.

Figure 1:
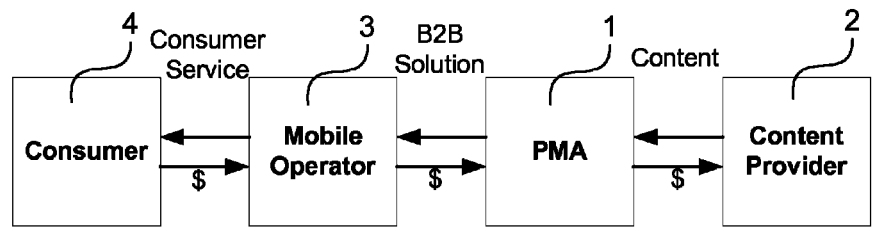
Figure 2:
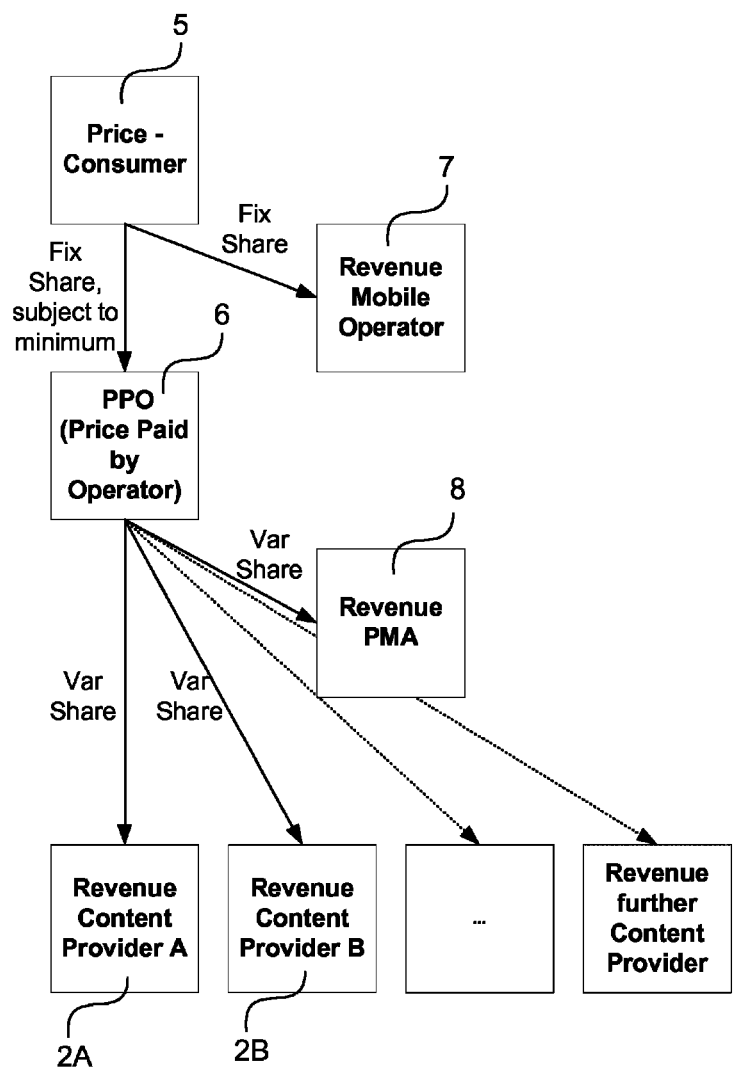
Figure 3:
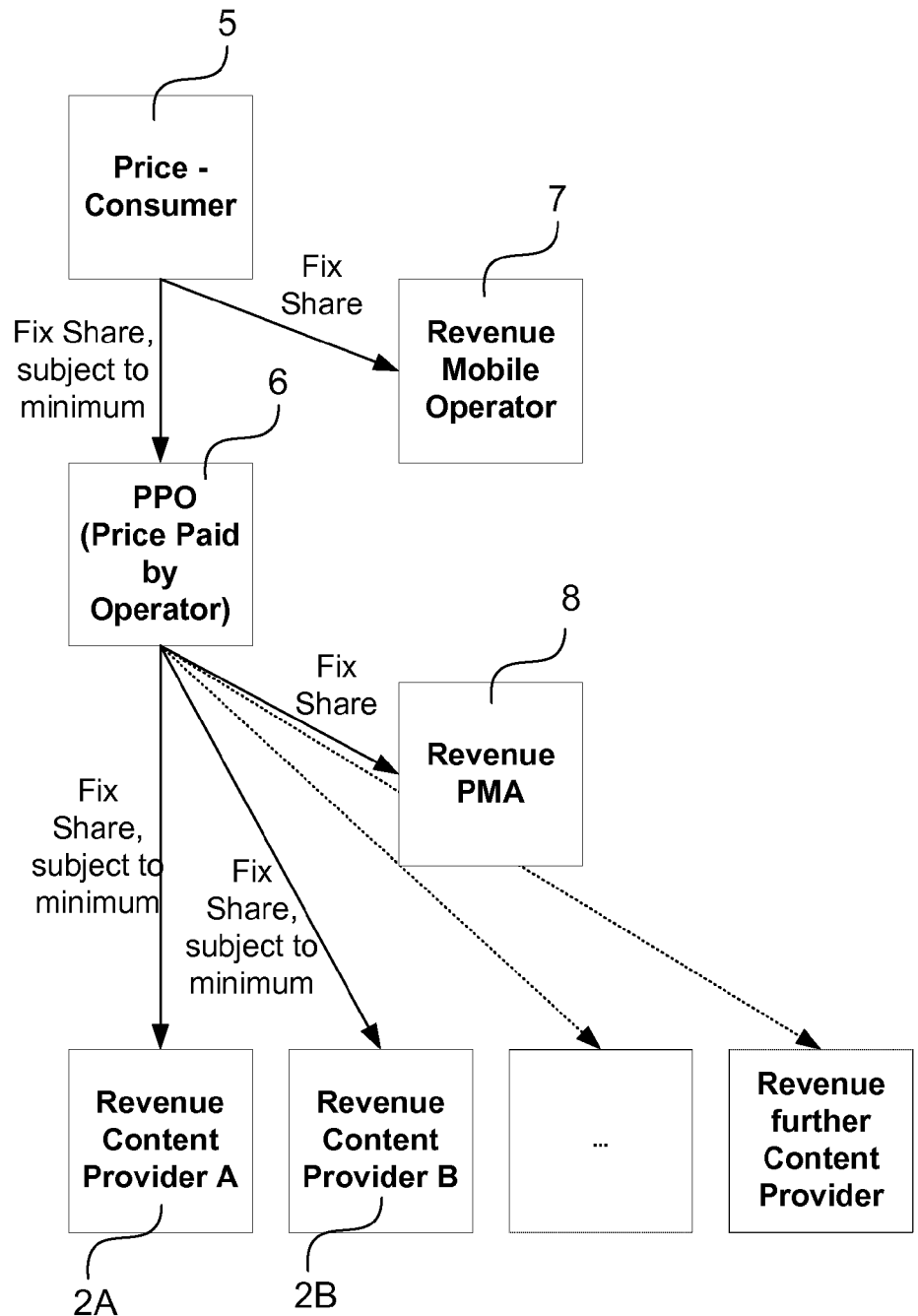
Figure 4:
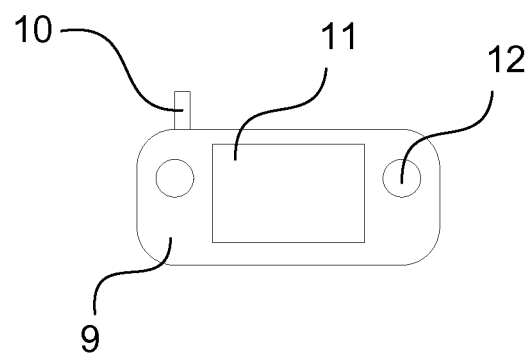
Figure 5:
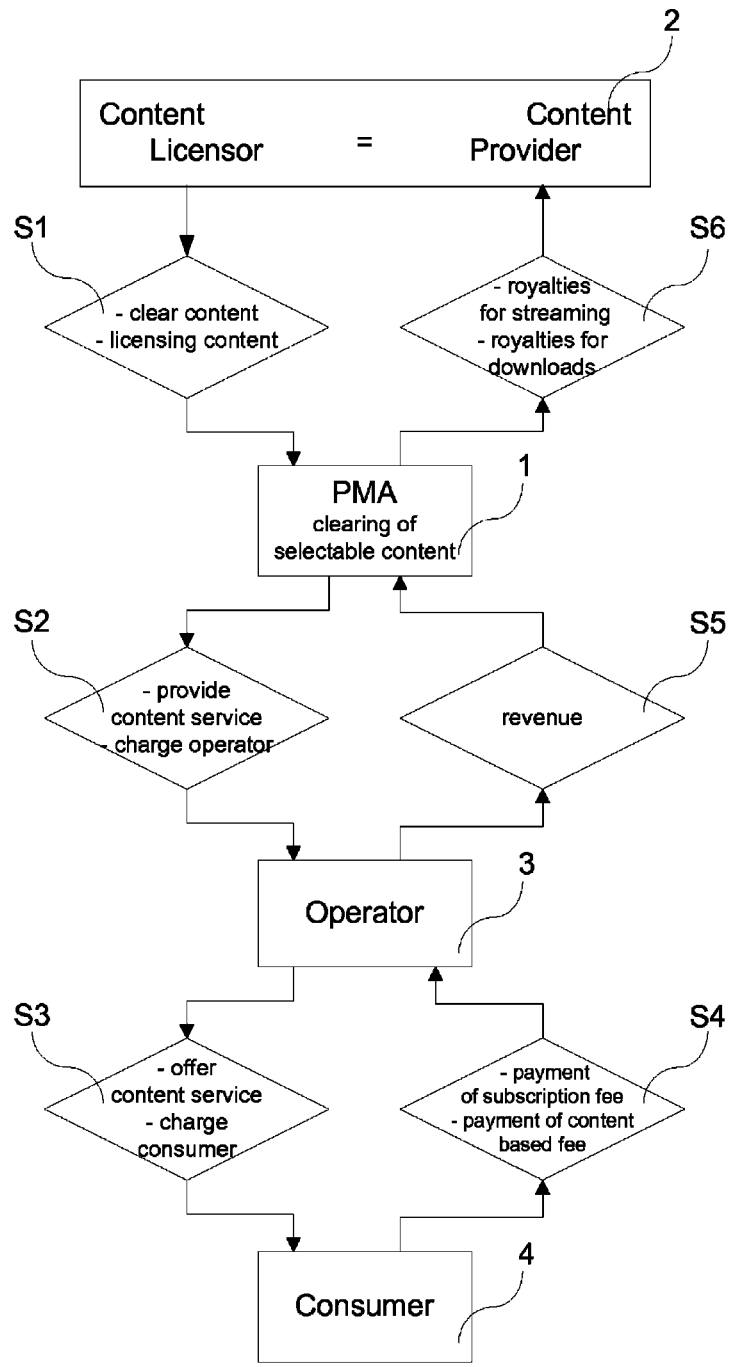
Figure 6:
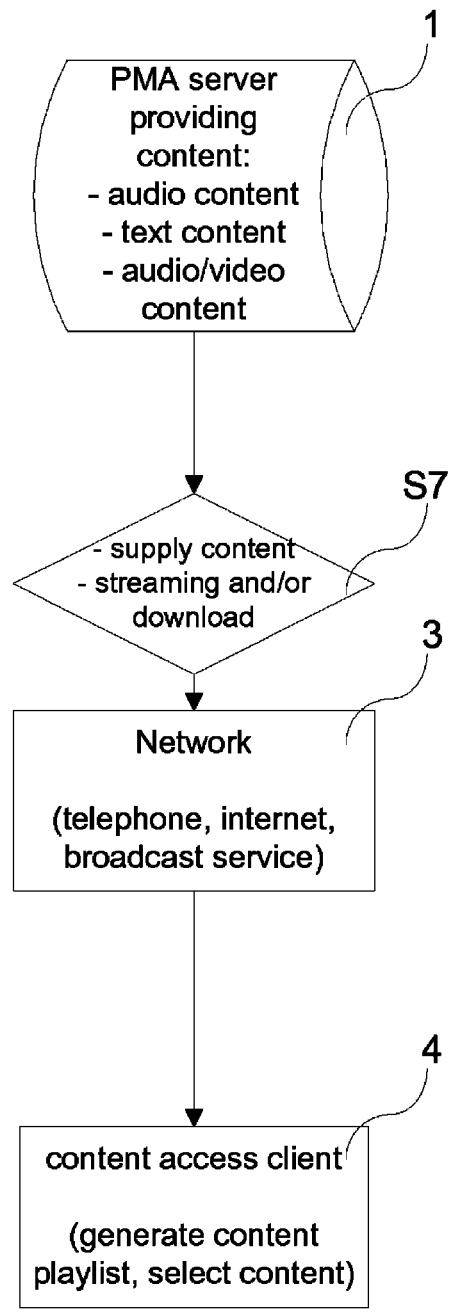

In the following detailed description, reference will be made to the accompanying drawings, wherein:

FIG. 1 shows an example of a general business model to sell content, which is provided by one or more content providers, to at least one consumer via a network according to a preferred embodiment of the present invention, FIG. 2 shows a first exemplary revenue model of the general business model shown in FIG. 1, FIG. 3 shows a second exemplary revenue model of the general business model shown in FIG. 1, FIG. 4 shows an example of a content access device according to the present invention, FIG. 5 shows a business flow chart of the preferred embodiment according to the present invention, and FIG. 6 shows a technical flow chart of the preferred embodiment according to the present invention.

DETAILED DESCRIPTION OF ILLUSTRATIVE PREFERRED EMBODIMENTS OF THE INVENTION

A clearing of the selectable content according to the present invention includes preferably providing the content so that the consumer can retrieve the content legally, e.g., so that the user need not perform any other action besides the retrieval to be able to legally use the content.

A direct supply of any content selected by the consumer to the consumer via the operator includes preferably supplying the content without the operator having to perform any processing steps other than the provision of a channel for the communication between consumer and content service provider. In other words, the operator exploits the content supply of the party that offers the content, e.g., a content provider or a content service provider. Supplied content in the sense of the invention is preferably content that is retrieved by the consumer.

Further, in addition to charging the operator for the supplied content, preferably the operator is also charged for the content service itself, e.g., the possibility to offer content and to supply the content in a way convenient for the user, which content service is exploited by the operator. This content service charge might be included in the charge for the content, e.g. a particular share thereof, or might be charged extra.

Up to now, e.g., in existing content supply mechanisms, the operator normally charges the consumer only for using the operator's services to retrieve the content, but not for the content itself. By the direct supply of the content to the consumer via the operator, but charging the operator for the supplied content, and therewith in fact 'licensing' or 'sub-licensing' the supplied content to the operator, the method according to the present invention has the advantage that the content provider (or a service provider arranged between one or more content providers and one or more operators, as will be set-out below in more detail) allows the operator to additionally also charge for the content itself. The content provider or service provider need not charge every consumer for the supplied content, but must only set up a channel of payment to the respective operators. In turn, no additional channel for payment of the retrieved content has to be set up by the consumer, thereby making content access more convenient for the consumer.

Further, the operator also has the advantage of being able to decide on the prices for the delivered content and/or to offer the content as an additional value for his services, e.g., several free or package-charged content items that might be supplied to the consumer. Furthermore, the operator can offer the content service without any other tasks besides the provision of a channel and charging for the channel and additionally for the content. In other words, since the consumer is allowed to select the service by other than the operator, namely a content provider or a content service provider, and the content is provided from this instance directly to the customer, the operator gets a turnkey solution to supply content for providing the actual customer charging functionality (as set-out above, e.g., either as a direct charge for supplied content or as an added value). This turnkey solution might be described as licensing the content and a content service, e.g., a server infrastructure and a corresponding client for the customer, to an operator.

Generally, the operator that is used by the customer to retrieve the content and that, therefore, pays for the content, is allowed to charge each individual consumer for the retrieved content. This may be accomplished by indicating to the operator that a 'chargeable content' is currently supplied to a consumer via the operator, or by assigning the supplied content to a secure identifier for a particular connection that was set-up by the operator, which identifier might be designed so that the consumer is anonymous for the content supplier or service supplier, but not for the operator, and then supplying a list that comprises these identifiers and the respectively corresponding charge to the operator.

The method according to the present invention preferably comprises the step of licensing content from the at least one content provider to provide selectable content that can be offered within said content service.

This step provides for a content service provider, e.g. the above-described PMA service provider, to offer the content that is licensed from a content provider to a consumer via an operator used by the consumer. The content service provider need not generate its own content for offering the content service to allow for the selection of certain content by the consumer, but only needs license contracts with the content providers and—of course—an access to the licensed or licensable content. Further, the content service provider need not install a contract and payment scheme with consumers of his service, but needs only to have contracts with the respective operators his consumers use to retrieve the content. The present invention is in particular designed for content service providers that serve as a linkage between several content providers and—via operators—consumers.

Content service providers working according to the present invention might then tailor the licensed content to particular individual consumers or groups of consumers, provide the content directly to the individual consumers or groups of consumers via respective operators used by the consumers, and sell such content via the respective operators when the content is accessed by a consumer, e.g. charge the respective operators for the supplied content. Further, the operators can exploit the content service, e.g. the consumer does not realize that a content service provider is in fact offering the content service, but thinks that the operator performs the content service, which in fact buys the whole service and performs the billing to the user.

The method according to the present invention preferably further comprises the steps of generating a content playlist for the consumer, and/or allow for individual content selections by the consumer for allowing the consumer to select content within said content service.

With a content playlist that can be communicated to a consumer and/or supplied in a form of direct content retrieval to the consumer, a content service provider can offer a convenient way for a consumer to retrieve the content. The playlist might be tailored to the consumer, e.g. based on a user or consumer profile that is managed by the content service provider based on like/dislike indications for particular content items of the playlist, e.g. which is dynamically managed.

As indicated above, in the method according to the present invention preferably the operator used by the consumer is allowed to charge the consumer for the retrieved content. However, as also indicated above, the operator need not necessarily charge the consumer for this content. The decision whether or not to charge is completely in the hand of the operator. The operator pays, for example, a license fee for the supplied content (that preferably includes a share for the content service provision) and therewith it can be secured that the content provider obtains payment for the supplied content. The content provider might receive this payment either directly from the operator in case the content provider offers the content service (and therewith combines the functionality of content provider and content service provider), or the content provider might receive this payment via the content service provider in case the operator exploits the content service from the content service provider.

In the method according to the present invention, the consumer preferably subscribes to a content service to be able to retrieve content. Therefore, preferably the operator is allowed to offer the content service to consumers that subscribe to the content service with the operator. Such a subscription can serve for billing purposes when used by the operator the consumer uses. Further, such a subscription might also serve as an indicator to generate a new consumer profile for the content service provider.

In case of a subscription to a content service, in the method according to the present invention, the consumer preferably has the ability to receive a predetermined amount of content with payment of a regular subscription fee. Therefore, preferably the operator is allowed to offer said content service and the ability to receive a predetermined amount of content within said content service to the consumer for the payment of a regular subscription fee.

Alternatively or additionally, in the method according to the present invention, the consumer preferably has the ability to receive content with payment of a content-based fee, e.g. pay per retrieved content item. Therefore, alternatively or additionally, the operator is allowed to offer said content service and the ability to receive content within said content service to the consumer for the payment of a content based fee.

In the method according to the present invention, preferably the content is provided as a streaming and/or download service to the consumer. In this case, according to the present invention preferably the at least one content provider receives royalties based on consumed time in case of a streaming content consumption by the consumer, and/or the at least one content provider receives royalties based on consumed content items in case of a download content consumption by the consumer. As stated above, the content provider might receive these royalties either directly from the operator or via a content service provider.

In the method according to the present invention the content is preferably provided to the consumer as a telephone service, further preferably via a mobile telephone network, and/or internet service, further preferably via broadband internet, and/or broadcast service, further preferably via digital interactive TV.

In other words, the operator used by the consumer to exploit the content service is preferably a telephone operator, and/or internet provider, and/or broadcaster.

In the method according to the present invention the content is preferably audio content, in particular music content, and/or text content, in particular news content, and/or audio-visual content, in particular music content, e.g. music clips, or news content or movie content.

The method according to the present invention alternatively or additionally preferably comprises the steps of providing a content access client to the at least one consumer. This step provides for a reliable and/or secure communication between consumer and content service provider (or in case of a direct marketing of the content also between consumer and content provider), since the content access client is tailored to the content selection and provision system. Such a content access client may then allow the consumer to select playlists according to current mood and to refine his/her consumer profile. Such a content access client might also serve to prevent the request of content that cannot be delivered, since it is e.g. not licensed from a particular content provider.

According to the present invention, an operator is allowed to offer the content service without having to supply any of the content related services on his own, but only by providing the charging functionality, e.g. by paying for the supplied content (and preferably also for the possibility to offer content) and being allowed to charge the consumer for his/her retrieved content. In other words, the present invention provides for an operator to exploit the content service.

It is understood that all of the above single features may be arbitrarily combined to form respective preferred embodiments according to the present invention.

As indicated above, content refers to any information and entertainment item in one media format or the combination of multiple media formats. Media Formats may be audio, video, images, pictures and text. One piece of content, e.g. one song, one news article, one movie, etc., is generally referred to as an "item."

The content itself is preferably provided based on existing technology i.e. hardware and/or software, that is e.g. set-up like today's services for the download of ring-tones for mobile phones or for the download or streaming of songs via the Internet. This content provision is preferably performed by the service provider and gets exploited by the operator. Also, the consumer device is preferably based on existing technology, like a mobile phone, personal digital assistant, smartphone, personal computer, home entertainment product, e.g., TV set, HiFi stereo, game console, and/or mobile entertainment product, e.g. Network Walkman by Sony Corporation. The respectively used device only needs a content access client that is implemented in known technology and adapted to the service according to the present invention. The content access client might be realized in hardware, e.g. as a programmed or hard-wired chip or ASIC, or in software or firmware to be loaded onto the consumer device. The content access client also provides a functionality that enables the operator to charge the consumer based on accessed content and/or based on a subscription fee. Further, this functionality enables the operator to pass on at least a part of the data provided by the content access client, namely that data relevant for the content access, e.g. which downloads have been made by the consumer and/or which streams have been received by the consumer, to the service provider together with and/or in connection with the payment for that streamed and/or downloaded content so that the service provider can determine whether or not appropriate payments are received for all supplied content. It is preferred that the service provider receives no information in respect to the consumer that finally received the content.

Turning to the figures, FIG. 1 shows an exemplary mode for carrying out the invention by way of a business model for the PMA service provider. As shown in this example, the PMA service provider 1 provides for an end-consumer service targeting the mass market, e.g. for music and news. Involved in establishing this end-consumer service are a content provider 2, the PMA service provider 1, and at least one mobile operator 3, as well as at least one consumer 4.

The PMA service provider 1 licenses content from the content provider 2, e.g. as a non-exclusive license, implements and operates a PMA platform, e.g., a server that allows the selection of content by a consumer 4 and organizes the supplying of selected content to the consumer 4, implements and provides a PMA client to the consumer 4, e.g. an access to the PMA platform, licenses the PMA concept, e.g. the possibility of selected content, to the mobile operator 3, e.g. again as a non-exclusive license.

The mobile operator 3 provides infrastructure to transfer the service (including the content) over (mobile) networks to the end-consumer 4, e.g. his/her (mobile) content retrieval device, and offers consumer service, e.g. has pricing authority and performs billing.

Of course, also more than one content provider 2 might be involved as well as at least one alternative or other type of operator 3. For example, the content of one or more content providers 2 for music, one or more content providers 2 for news, might be offered to the consumer(s) 4 via one or more mobile operators 3, one or more conventional wire based phone operators 3, one or more broadcasters 3, one or more internet providers 3.

The above principles apply to these other content providers 2 and other types of operators 3 as well. Thus, the present invention provides for the access of predetermined content from a content provider 2, offers this content to consumer(s) 4 via at least one operator 3, charges the operator(s) 3 for content that gets selected and supplied, and pays license fees for this content to the content provider(s) 2. The charging of the consumer(s) 4 for retrieved content is completely in the hand of the operator(s) 3. Therewith, the effort to charge the consumer(s) 4 from the side of the service provider 1 is reduced.

FIG. 2 shows a first exemplary revenue model of the general business model shown in FIG. 1, namely a time-based subscription model that is basically characterized by the features that a consumer 4 subscribes to the service and a monthly subscription price 5 includes a certain number of minutes consuming audio and/or audiovisual content. Royalties to the content provider are based on consumed audio and/or audiovisual content/second. An example would be that a mobile operator 3 provides a service of 300 minutes of audio or audiovisual content/month for consumer price: $10/month, and 200 minutes have been consumed by the consumer 4.

The price for this service that has to be paid by the operator to the service provider, e.g., the price paid by operator 6, might be 50% (fixed, subject to agreement between PMA service provider 1 and mobile operator 3), e.g., $5/month. Therewith, the (mobile) operator 3 has a revenue 7 of 50%, here $5/month from the consumer 4.

The respective content provider 2 receives the royalties for the supplied content from the service provider 1. In the described first example the following assumptions are made: 2 content providers (A, B) 2A, 2B, from provider A, 60 minutes of music streamed, from provider B 40 minutes of music streamed, price for content from provider A: $0.01/minute, and price for content from provider B: $0.02/minute.

Therefore, the following revenues are made by the content providers 2A, 2B:

Content Provider A: $1.20, and Content Provider B: $1.60. Therewith, the PMA service provider 1 has a revenue 8 of $2.20.

It is to be noted that the service provider 1 pays royalties to the content providers 2A, 2B, e.g, for purposes of copyright, based on time based consumption of audio/audiovisual content consumed.

FIG. 3 shows a second exemplary revenue model of the general business model shown in FIG. 1, namely an item-based subscription model. An example would be that a mobile operator 3 provides a service of 20 downloads of music/month, and 5 ringtones, at a consumer price of, for example, $50/month, and a consumer 4 downloaded 25 songs and 5 ringtones. The price for this service that has to be paid by the operator 3 to the service provider 1 might be 50% (fixed, subject to agreement between PMA service provider 1 and mobile operator 3), e.g., $25/month. Therewith, the (mobile) operator 3 has a revenue 7 of 50%, here $25/month from the consumer 4.

The respective content provider 2 receives the royalties from the service provider 1. In the described second example the following assumptions are made: 2 Content Providers (A, B) 2A, 2B, from provider A, music downloads are possible, provider B, provides ringtones, price for content from provider A: $0.80/song, and price for content from provider B: $0.5/ringtone. Therefore, the following revenues are made by the content providers 2A, 2B: Content Provider A: $20, and Content Provider B: $2.50. Therewith, the PMA service provider 1 has a revenue 8 of $2.50.

It is to be noted that the service provider 1 pays royalties to the content providers 2, e.g. for purposes of copyright, based on downloaded items.

FIG. 4 shows an example of a content access device 9 according to the present invention, which is used by the consumer 4 to select and retrieve content, e.g. to use the consumer service offered by the PMA service provider 1 via the mobile operator 3, who exploits this service. The shown content access device 9 embodies a content access client that allows for selection and reception of content, e.g. a connection to a server of the PMA service provider 1. This content access client might be realized in hardware or software. The hardware realization might comprise a programmed or hard-wired chip or ASIC. The software realization might comprise a (downloadable) program or firmware to be loaded onto the consumer device. Besides the generally known technical functionality to access content, the content access client provides the above-indicated technical functionality to enable an appropriate charging according to the present invention. The content access device 9 or the content access client might be stand-alone units and/or integrated into another device, e.g. a mobile phone or a PDA.

The shown exemplary content access device 9 comprises an antenna 10, a content viewer 11, and a speaker 12. Further, the content access device 9 comprises controls (not shown) to operate the content access device 9.

The antenna 10 is used to provide content selection information to the PMA service provider 1 via a wireless network that is operated by the mobile operator 3 and to pass on identity information about the consumer, e.g. the used telephone number, and information in respect to the received content to the mobile operator 3. Further, the antenna 9 is also used to receive the content from the PMA service provider 1 via the wireless network that is operated by the mobile operator 3.

The content viewer 11 indicates a display and "media player" capable of playing text, audio, and audiovisual content. The audio content and audio part of the audiovisual content is reproduced via the speaker 12. The player controls (not shown) may be, for example, "keys" on the content access device and/or "buttons" within the content viewer, e.g. manipulated by way of a touch screen, or other modes of selection.

FIG. 5 shows a business flow chart of the method for generating revenue for supplied content according to the present invention. In a first step S1 the content provider 2, which is also the content licensor in this preferred embodiment, clears the content that is to be licensed and licenses the cleared content to the PMA service provider 1. Depending on the ownership of the content, the content provider and the content licensor might be different units. In a following second step S2 the PMA service provider 1 provides the content service, i.e. the offering of downloadable content and/or content streams. The content service is provided to a consumer 4 via an operator 3 who exploits this content service. Therefore, the PMA service provider 1 also performs a charging of the operator 3 in the second step S2. Thereafter the operator 3 offers the exploited content service to the consumer 4 and charges the consumer 4 in a third step S3. In a following fourth step S4 the consumer 4 effects a payment of a subscription fee and/or a content based fee to the operator 3. The operator 3 then forwards a part of the received payment to the PMA service provider 1 as revenue for the PMA service provider 1 in a following fifth step S5. Of course, alternatively the revenue can also be paid by the operator 3 to the PMA service provider 1 in advance of receiving the payment of the subscription fee and/or the content based fee from the customer 4. Following, the PMA service provider 1 pays royalties for steaming content and/or royalties for downloads to the content provider 2, who equals to the content licensor in this case, in a last sixth step S6.

FIG. 6 shows a technical flow chart of the method for generating revenue for supplied content according to the present invention. This technical flowchart depicts the content supply route from the server of the PMA service provider 1. It is shown that in this exemplary case audio content and/or text content and/or audio/video content is available on the server of the PMA service provider 1. The server of the PMA service provider 1 is connected to the content access client of a consumer 4 via a network of the operator 3, here a telephone network and/or the internet and/or a broadcast service. The content access client of the consumer 4 selects content that the user wants to access (or the user selects content that she/he wants to access via the content access client), e.g. by way of a content playlist that is preferably automatically generated according to a user profile, via the network from the content service that is provided by the PMA service provider (see second and third steps S2 and S3 above). After such a selection the server of the PMA service provider 1 supplies the content via the network of the operator 3 in a streaming and/or download mode to the content access client of the consumer 4 in a content supply step S7.

Various modifications and variations of the described devices and methods of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the art or in related fields are intended to be within the scope of the following claims.

What is claimed is:

1. A method performed by a content service for generating revenue from content supplied by a content provider to a consumer device, comprising:
   using one or more computers to perform the steps of:
      connecting the content service to a data network of a network operator, the content service configured to enable consumer access, over the data network, to content available from a content provider;
      providing, to a consumer device connected to the data network of the network operator, a content access client configured to receive a selection of content directly available from a server of the content provider and configured to enable the network operator to charge the consumer for access to the content;
      receiving a selection by a consumer of particular content available from the content provider via the consumer device;
      providing to the network operator the selected content to supply to the consumer device via the data network without the content provider or the content service directly charging the consumer;
      receiving payment from the network operator for the content supplied to the consumer device; and
      sending a portion of payments received from the network operator to the content provider.

2. The method according to claim 1, further comprising:
   generating, using the content service, a content playlist comprising recommended content items for a consumer; and
   receiving from the consumer a selection of content from the content playlist using a consumer device.

3. The method of claim 2, further comprising:
   tailoring the content playlist to the consumer based on a profile of the consumer, the profile being managed by the content service based on like/dislike indications by the consumer for particular content items in the content playlist.

4. The method according to claim 1, wherein the content is provided as a streaming and/or download service to the consumer.

5. The method according to claim 1, wherein the content service provided to the consumer comprises at least one of a telephone service, internet service, and broadcast service.

6. The method according to claim 1, wherein the content comprises audio content.

7. The method according to claim 1, wherein the content comprises text content.

8. The method according to claim 1, wherein the content comprises audiovisual content.

9. The method of claim 1, wherein supplying the selected content to the consumer device comprises supplying the content without the network operator having to perform any processing steps other than the provision of a channel for communication between the consumer device and the content service.

10. The method of claim 1, further comprising:
    enabling the network operator to directly request payment from the consumer without involving the content service.

11. The method of claim 1, wherein the network operator comprises a mobile telephone carrier.

12. The method of claim 1, wherein the supplied content comprises news articles.

13. The method of claim 1, wherein receiving a selection by a consumer of particular content comprises receiving a user selection from among a plurality of playlists, the selection based on the consumer's mood.

14. The method of claim 1, wherein sending a portion of payments received from the network operator comprises paying royalties to the content provider for content supplied to the consumer device.

* * * * *